United States Patent [19]
Koleske et al.

[11] 3,725,352
[45] Apr. 3, 1973

[54] ABA BLOCK POLYMERS OF POLYESTERS AND POLYETHERS

[75] Inventors: Joseph Victor Koleske; Rene Marie-Joseph Roberts; Frank Paul Del Giudice, all of Charleston, W. Va.

[73] Assignee: Union Carbide Corporation, New York, N.Y.

[22] Filed: Dec. 30, 1970

[21] Appl. No.: 102,924

[52] U.S. Cl. .......... 260/75 R, 8/162 R, 260/31.6, 260/485 G, 260/485 P, 260/873
[51] Int. Cl. .......................................... C08g 39/10
[58] Field of Search ......... 260/860, 873, 31.6, 485 G, 260/485 P, 75 R

[56] References Cited

UNITED STATES PATENTS

| | | | |
|---|---|---|---|
| 3,557,039 | 1/1971 | McIntyre et al. | 260/75 R |
| 2,950,313 | 8/1960 | Kirkpatrick | 260/485 P |
| 3,372,143 | 3/1968 | Terada et al. | 260/75 EP |
| 3,374,208 | 3/1968 | Seiner et al. | 260/75 EP |
| 3,574,789 | 4/1971 | Bungs et al. | 260/75 R |

*Primary Examiner*—William H. Short
*Assistant Examiner*—Edward Woodberry
*Attorney*—Aldo John Cozzi, James C. Arvante, and Francis M. Fazio

[57] ABSTRACT

The invention relates to novel, solid, substantially water-insoluble ABA block polymers in which the A blocks comprise recurring linear units of the formula

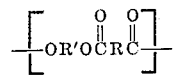

wherein the substituents R and R' are divalent aliphatic groups and in which the B block comprises recurring oxyalkylene units. The block polymers have utility as plasticizers for polyvinyl chloride resins and as dye assists for polypropylene fiber.

4 Claims, No Drawings

ABA BLOCK POLYMERS OF POLYESTERS AND POLYETHERS

This invention relates to novel, solid, substantially water-insoluble ABA block polymers in which the A blocks comprise recurring linear units of the formula

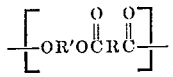

wherein the variables R and R' are divalent aliphatic groups and in which the B block comprises recurring oxyalkylene units. In one aspect, the invention is directed to novel shaped and molded articles such as fibers and yarns which comprise polyalkenes and the aforesaid novel ABA block polymers.

The novel block polymers which are obtained by the practice of the invention possess an ABA structure and comprise:

1. A blocks or segments having the recurring unit represented below:

I
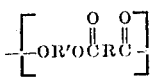

wherein R' is a divalent aliphatic hydrocarbon or aliphatic oxahydrocarbon radical most suitably containing from 2 to 20 carbon atoms, wherein R is a divalent aliphatic hydrocarbon radical most suitably containing up to 20 carbon atoms, and wherein said A blocks represent from about 15 to about 85 weight per cent, preferably from about 30 to about 70 weight per cent, based on the weight of the ABA block polymer;

2. a B block or segment having the recurring unit shown below:

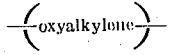   (II)

wherein the alkylene moiety thereof most suitably contains from 2 to 5 carbon atoms; and wherein said B block represents from about 85 to about 15 weight per cent, preferably from about 70 to about 30 weight per cent, based on the weight of the ABA block polymer;

3. wherein the terminal oxy (—O—) moiety of the B block is monovalently bonded to the terminal carbonyl

moiety of one of the A blocks to form an oxycarbonyl group

and wherein the terminal alkylene moiety of the B block is monovalently bonded to an oxy group which in turn is monovalently bonded to the terminal carbonyl

moiety of the other A block to thus form an oxycarbonyl group;

4. wherein the average molecular weight of the B block is at least about 1,000, desirably from about 3,000 to about 50,000, and preferably from about 5,000 to about 25,000; and 5. wherein the average molecular weight of the ABA block polymer is at least about 2,000, desirably from about 4,000 to about 80,000, and preferably from about 6,000 to about 60,000.

With further reference to the structure designated as Unit I above, it is preferred that R' be an alkylene or an oxaalkylene radical of 2 to 10 carbon atoms such as ethylene, propylene, butylene, 2,2-dimethyltrimethylene, hexylene, 3-oxypentylene, 3,6-dioxaoctylene, and the like; and that R be an alkylene radical of 1 to 10 carbon atoms such as methylene, ethylene, propylene, butylene, hexamethylene, octamethylene, and the like.

With reference to Unit II above, it is preferred that the alkylene moiety thereof contain from 2 to 3 carbon atoms as illustrated by ethylene, propylene, and mixtures thereof.

It should be noted that the substantially linear polymeric chain of the ABA block polymers can be interspersed with other moieties or groups such as the urethane group, $$-\text{NHCO}-$$

the mono- and polyaromatic rings including fused and bridged rings such as phenylene, tolylene, biphenylene, naphthylene, phenylene-alkylene-phenylene, phenylene-alkylidenephenylene; ureylene; etc. Such groups, if present, represent but a relatively small weight per cent of the novel ABA block polymer. The terminal hydroxyl or carboxyl end groups of the novel block polymers, if desired, can be further reacted with carboxylic acids, anhydrides, isocyanates, epoxides, etc., thus resulting in block polymers which are terminated with groups such as alkoxy, e.g., methoxy, butoxy, octoxy, dodecoxy, etc.; the unit

wherein the R variable has the significance noted in Unit I supra; the unit

wherein both R variables have the significance stated in Unit I supra; and so forth.

The novel block polymers can be prepared by reacting a polyoxyalkylene diol preferably having an average molecular weight of at least about 1,000, desirably from about 3,000 to about 50,000, and preferably from about 5,000 to 25,000, with a dicarboxylic acid or anhydride, and a glycol. Though the reaction can be effected non-catalytically, it is desirable to employ a conventional esterification catalyst. It is observed that the stannous dialkanoates and tetraalkyl titanates are suitable catalysts for this reaction. Specific illustrations include stannous diacetate, stannous dibutanoate, stannous dioctanoate, stannous di(2-ethylhexanoate), stannous distearate, tetrabutyl titanate, sulfuric acid, and the like.

These catalysts are employed in a catalytically significant concentration. In general, a catalyst concentration in the range of from about 0.0001 and lower, to about 3, and higher, weight per cent, based on the weight of reactants, is suitable. The reaction is conducted at an elevated temperature. In general, a temperature in the range of from about 100°C., and lower, to about 250°C. is preferred. The reaction time can vary from several minutes to several hours, e.g., 48 hours or more, depending upon the correlation of variables such as temperature, choice of reactants, choice of catalyst, etc.

The reaction is preferably conducted in the liquid phase and under an inert atmosphere, e.g., nitrogen. Water formed by the condensation reaction may be removed by distillation. Most desirably, the operative conditions are adjusted so as to achieve a practical and commercially acceptable reaction rate.

The concentration of the reactants, that is, polyoxyalkylene diol, dicarboxylic acid, and glycol will significantly govern the average molecular weight of the two A blocks of the resulting ABA block polymeric product. The average molecular weight of the B block will, of course, be equal to the average molecular weight of the polyoxyalkylene diol reactant. To obtain hydroxyl terminated ABA block polymers one would employ mole ratios of polyoxyalkylene diol, dicarboxylic acid, and glycol in which the total hydroxyl/carboxyl ratio (OH/COOH is greater than one, e.g., from about 1.05 to about 1.5. Alternatively, to obtain carboxyl-terminated ABA block polymers, one would use carboxyl/hydroxyl ratios (COOH/OH) greater than one, e.g., from about 1.05 to about 1.5. Oftentimes, the course of the reaction may be followed by making acid number or hydroxyl number determinations, as may be the case.

Glycols which can be employed in the esterification reaction include, for example, ethylene glycol, diethylene glycol, triethylene glycol, tetraethylene glycol, 1,2-propylene glycol, dipropylene glycol, 1,2-butylene glycol, 1,6-hexanediol, 1,4-butanediol, 2,2-dimethyl-1,3-propanediol, and the like. Suitable dicarboxylic acids include oxalic acid, malonic acid, succinic acid, glutaric acid, adipic acid, pimelic acid, suberic acid, azelaic acid, sebacic acid, their anhydrides, and the like. Mixtures of glycols as well as mixtures of dicarboxylic acids can be employed. If desired, carboxyl-terminated polyesters can be prepared by reacting predetermined amounts of dicarboxylic acid and glycol (in which COOH/OH is greater than one) in accordance with known procedures. The resulting carboxyl-terminated polyesters can then be reacted with the polyoxyalkylene diol reactant using a mol ratio of said polyester to said diol equal to approximately two to prepare the novel ABA block polymers.

The polyoxyalkylene diols which are useful in the process to prepare the novel ABA block polymers are commonly produced by the polymerization of an alkylene oxide having terminal epoxy groups such as ethylene oxide, propylene oxide, butylene oxide, etc., or an aliphatic or aromatic compound having two primary hydroxyl groups. Such compounds include ethylene glycol, propylene glycol, butylene glycol, diethylene glycol, bis(2-hydroxyethoxy)benzene, 1,4-cyclohexanediol, 2,2-bis(4-hydroxyphenyl)propane, and the like. Preferred polyoxyalkylene diols are shown by the following formula:

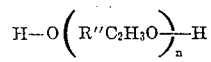

wherein R'' is hydrogen or lower alkyl of 1 to 3 carbon atoms, and wherein $n$ is an integer such that the average molecular weight of the polyoxyalkylene diol chain is at least 1,000, desirably from about 3,000 to about 50,000, and preferably from about 5,000 to about 25,000.

In one suitable embodiment, the B block or segment of the novel ABA block polymer represents the product of the reaction of a polyoxyalkylene diol which has an average molecular weight of from about 1,000 to about 15,000, preferably from about 2,000 to about 10,000, with a diglycidyl diether of a dihydric phenol, preferably of a bis-(4-hydroxyphenyl)alkane such as 2,2-bis(4-hydroxyphenyl)-propane, at a concentration of from about 1.2 to about 1.5 moles of said polyoxyalkylene diol per mole of said diglycidyl diether compound, said B block having an average molecular weight of from about 3,000 to about 45,000, preferably from about 6,000 to about 30,000. Particular suitable polyoxyalkylene diols are those in which the oxyalkylene moiety is oxyethylene, oxypropylene, oxyethyleneoxypropylene.

The novel block polymers have a myriad of important uses. They can be used as plasticizers for polyvinyl chloride resins; as additives in tape joint compounds to improve drying characteristics; as surfactants, and the like.

Greatly improved dyeability has been observed quite unexpectedly, for shaped and molded articles, e.g., yarns, fibers, films, tapes, slit films, etc., which are formed from a blend of the novel ABA block polymer and synthetic polymer such as the crystalline olefin polymers, e.g., polyethylene, polypropylene, polybutene, poly(4-methylpent-1-ene), and the like; the acrylonitrile polymers, e.g., polyacrylonitrile, polymethacrylonitrile, and the like; the vinyl chloride copolymers, e.g., vinyl chloride/acrylonitrile copolymer, and the like; the cellulosic esters such as the cellulose acetates, the cellulose propionates, and the like; poly(ethylene terephthalate); and the like. This high absorption capacity for dyes, especially premetallized dyes, is achieved without any noticeable decrease in the mechanical properties such as tensile strength, modulus, elongation, and the like. For example, polyolefin fibers produced from blends of polyolefin and the novel ABA block polymer exhibit mechanical properties which are substantially the same as those obtained from the prevailing crystalline polyolefin per se but have improved dyeability, a higher moisture absorption capacity, etc.

The aforesaid blends are readily made by blending the selected amounts of ABA block polymer and synthetic polymer with the application of heat and/or pressure in any suitable apparatus. It is usually necessary to apply sufficient heat to raise the polymers above their melting points. Suitable temperatures to be employed in blending the polymers are, for example, approximately 115°C. and higher, but not so high that significant decomposition of the polymers or other ingredients takes place. Temperatures as high as 180°C. to about 200°C. can be employed, if desired, although lower temperatures are usually suitable and economically preferred.

Suitable equipment for blending the polymers together include Banbury mixers, screw extruders, two-roll mills, etc. The time of blending or fluxing is not narrowly critical and a sufficient blending time to obtain a substantially uniform blend is usually satisfactory.

Illustrative times of blending are in the range of from about 1 or 2 minutes to 30 minutes or an hour. In the usual case, about 5 to 15 minutes is adequate. If desired, other materials can be added during blending operation such as plasticizers, antioxidants, light stabilizers, heat stabilizers, etc., and are of the usual types and are used in the usual amounts employed in alkene polymers such as polyethylene.

Thus, in a preferred embodiment, the invention relates to novel shaped and molded articles such as fibers, yarns, filaments, staple, tow, slit film, woven cloth, etc., which have improved dyeability characteristics and which are formed by blending a synthetic polymer such as a crystalline olefin polymer exemplified previously with/without cellulosics plus the novel ABA block polymer. In addition, differential dyeing can be accomplished by piece dyeing goods such as carpets and upholstry which are woven from unmodified fiber and a fiber previously blended with the novel ABA block polymer. Shaped and molded articles containing up to about 15 weight per cent of ABA block polymer, based on the total weight of ABA block polymer and synthetic polymer such as olefin polymer, can be dyed to deep and vivid shades of color. In general, from about one to about 12 weight per cent of ABA block polymer in the shaped and molded articles comprising the crystalline olefin polymer and ABA block polymer can be dyed to a depth of color equivalent to that of wool dyed under similar conditions.

In a second preferred embodiment, the invention relates to novel shaped or molded articles having improved dyeability characteristics formed from a blend of crystalline olefin polymer such as polypropylene, novel ABA block polymer, and a dye assistant, preferably poly(vinyl pyridine). Additional dye assistants which can be employed include, for example, poly(vinyl pyrrolidone), poly(acrylic acid), and poly(ethyleneimine). These dye assistants can be added to the blend of solid olefin polymer and novel block polymer in an amount up to about 10 weight percent, and higher based on the total weight of the aforementioned two polymers.

The molded and shaped articles of the instant invention can be dyed by various methods. For example, the polymeric blends which make up the shaped and molded articles can be dyed in bulk form or else initially shaped into articles such as fibers achieved by spinning techniques and then dyed. These techniques are conventional in the art as shown in, for example, U.S. Pat. No. 3,312,755. The amount of dye which is used is that amount necessary to impart the desired shade of color. The shaped and molded articles of the instant invention can take up dyes in amounts up to about 5 weight percent, and higher, based upon the weight of the polymeric blend, but in many instances less than one to about 5 weight percent dye solution is generally sufficient to impart the desired shade of color.

The dyes which can be used with the shaped and molded articles include acid, disperse, basic, and premetallized dyes. It is especially with premetallized and disperse dyes that deep and vivid colors are, quite unexpectedly, obtained. Moreover, the affinity of such dyes to the aforesaid blends is achieved, as indicated above, without noticeable or detrimental effect on the properties of the shaped article, e.g., fibers, such as secant modulus, tensile strength, elongation, and the like.

Illustrative dyes are enumerated hereinafter. It is understood that the notation C.I. followed by a number refers to the Color Index assigned to dyes originally by the British in 1924 and subsequently updated in an attempt to specifically characterize dyes where possible. Other dyes can be found listed in the *Encyclopedia of Chemical Technology*, pages 327–445, Interscience Publisher, (1950). Among the premetallized dyes include, for instance, Cibalan Yellow GRL, Cibalan Yellow 2BRL, Cibalan Yellow FGL, Cibalan Brown 2GL, Cibalan Scarlet GL, Cibalan Red 2GL, Cibalan Orange RL, Cibalan Blue FBL, Cibalan Blue BL, Cibalan Blue BRL, Cibalan Blue 3GL, Capracyl Yellow GW, Capracyl Red G. Typical acid dyes are Formyl Violet S4B (C.I. 698), Martius Yellow (C.I. 9), Fast Red A(C.I. 176), Milling Orange (C.I. 274), Naphthol Green B(C.I. 5), Wood Green S (C.I. 737), Patent Blue A (C.I. 714), Violamine R (C.I. 758), Alizarin Saphinol B (C.I. 504), Alizrin Red S (C.I. 1034), Grumpsall Yellow (C.I. 197 ), Diamond Black F (C.I. 229), Callocyanine (C.I. 833), Eriochrome Azrol B (C.I. 720), Naphthol Green Y (C.I. 2), Naphthazarin (C.I. 1019), Coerulein (C.I. 783), and Solid Yellow 2G. Exemplary basic dyes are Rhodamine B (C.I. 749), Auramine (C.I. 655), Crystal Violet (C.I. 681), Safranine (C.I. 841), Methylene Blue (C.I. 922), Nile Blue A (C.I. 913), Acridine Orange NO (C.I. 788), Sevron Blue 5G (C.I. 51004), and Sevron Red GL. Disperse dyes can be typified by Celliton Fast Red GGA (C.I. 11210), Celliton Fast Black BA, and DuPont Victoria Green.

Of course, various additives such as carriers can be contained in the dye bath in order to secure a more rapid dyeing operation. The additive will be dependent upon the type of dye used and the selection is well within the ability of those skilled in this art.

The following Examples are illustrative. Unless otherwise specified, all percentages and parts are by weight.

The term "reduced viscosity," as is well known, is a value which also can be obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (or other common organic solvent such as cyclohexanone, toluene, chloroform, etc.) at 30°C.

The novel ABA block polymers prepared in accordance with the teachings disclosed herein are substantially water-insoluble, that is to say, not more than 25 weight percent of a given speciment of ABA block polymer can be dissolved in water maintained at 95°C. for one hour.

Crude fibers were prepared by blending a general purpose crystalline polypropylene having a melt flow of 12.0 and a Melt Index range of 5–50 at a temperature range of 150° to 300°C. and the novel block polymer on a two roll mill for several minutes, e.g., 5 to 60 minutes, at an elevated temperature, e.g., about 140° to 180°C. During the milling operation, about 0.5 weight percent of both ultra-violet and thermal stabilizers, i.e., diphenylpentaerythritol diphosphite and 2-(2'-hydroxy-3',5'-di-tert butyl)-5-chlorobenazltriazole (Tinuvin 327), were added. The cooled mill stock was then shaved with an electric drill and a 5/16-inch Speed Bore bit to prepare crude fibers for dyeing studies. The crude fibers were placed in the dye baths and dyed in a boiling water bath for one hour. After this period of time the fibers were separated by filtration, washed, and then scoured. The scouring was accomplished by placing the dyed fibers in about 50 milliliters of distilled water that contains one milliliter of a one percent aqueous soda ash solution and one milliliter of one percent aqueous nonionic surfactant solution such as those prepared by the ethoxylation of a $C_{11}$–$C_{15}$ linear alkanol with about 7 moles of ethylene oxide. The amounts of the various components of the scouring bath are per gram of fiber. The fibers were then scoured for 15 minutes in a boiling water bath, filtered, dried and the color evaluated.

The dye solutions employed to dye the aforesaid crude fibers are as follows:

i. When disperse dyestuffs are employed . . . .For each gram of fiber, 5 milliliters of a one percent aqueous dye solution and 0.5 milliliter of ninionic surfactant are added to about 50 milliliters of distilled water.

ii. When acid dyestuffs are employed ....For each gram of fiber, 5 milliliters of a one percent aqueous dye solution, 4 milliliters of an aqueous two percent $H_2SO_4$ solution, and 0.5 milliliter of a nonionic surfactant are added to about 50 milliliters of distilled water.

iii. When premetallized dyestuffs are employed . . . . For each gram of fiber, 5 milliliters of one percent aqueous dye solution, 2 milliliters of an aqueous 2 percent DAP solution and 0.5 milliliter of a nonionic surfactant are added to about 50 milliliters of distilled water.

iv. When basic dyestuffs are employed . . . .For each gram of fiber, 5 milliliters of a one percent aqueous dye solution and 0.5 milliliter of a nonionic surfactant are added to about 50 milliliters of distilled water.

The nonionic surfactant employed in the above dye solutions are prepared by the ethoxylation of $C_{11}$–$C_{15}$ linear alkanols with about 12 moles of ethylene oxide.

EXAMPLES 1–8

Various novel ABA block polymers were prepared in accordance with the following procedure. The polyethylene diol, dicarboxylic acid, and glycol were charged to a glass reaction vessel.

The system was flushed with nitrogen and the reaction mixture was maintained under reduced pressure, e.g., about 1 mm. of Hg, to thus remove water formed as a by-product during the reaction. The vessel was then placed in an oil bath maintained at 180°C. After about 20 hours at this temperature there was added to the vessel 0.1 weight percent tetrabutyl titanate, based on the total weight of the reactants. After a total reaction time of 24 hours, the reaction vessel was removed from the bath and cooled to room temperature. The reaction product was then dissolved in benzene, and precipitated and washed with hexane, followed by filtration to recover the resulting ABA block polymeric product. Other pertinent data are set in Table I below.

TABLE I

| Example number | Dicarboxylic acid | Wt. of acid | Glycol | Wt. of glycol[1] | Polyoxyethylene diol | Wt. of diol[1] | Yield of ABA polymer, percent | Reduced viscosity of ABA polymer, dl./gm[4] |
|---|---|---|---|---|---|---|---|---|
| 1 | Adipic acid | 4.8 | 1,6-hexanediol | 4.0 | (2) | 7.50 | 96 | 0.09 |
| 2 | do | 3.9 | 1,10-decamethylenediol | 4.6 | (2) | 7.50 | 95 | 0.14 |
| 3 | do | 3.9 | do | 4.6 | (2) | 7.50 | 97 | 0.10 |
| 4 | do | 5.1 | Diethylene glycol | 3.7 | (2) | 7.50 | 97 | 0.05 |
| 5 | do | 5.1 | do | 3.7 | (2) | 7.50 | 95 | 0.04 |
| 6 | Azelaic acid | 4.3 | 1,10-decamethylenediol | 4.0 | (2) | 7.50 | 97 | 0.18 |
| 7 | do | 5.2 | 1,6-hexanediol | 3.3 | (2) | 7.50 | 97 | 0.18 |
| 8 | Succinic acid | 4.2 | 2,2-dimethyl-1,3-propanediol | 4.0 | (3) | 7.50 | 97 | 0.11 |

[1] Weight of reactant is in grams.
[2] Polyoxyethylene diol having an average molecular weight of about 6,000.
[3] Polyoxyethylene diol having an average molecular weight of about 3,000.
[4] Reduced viscosity values were determined in benzene at 30° C. using a concentration of 0.2 dl./g.m

EXAMPLES 9–17

To test the dyeability of crystalline polypropylene without the novel block polymers as dye assistants, 20 parts of polypropylene was milled with 0.1 part UV stabilized and 0.1 part thermal stabilizer on a two-roll mill for five minutes at 170°C. Milling behavior was described as good. Crude fibers were then prepared and dyed and scored as noted in the procedure prior to the Examples. The results are set out in Table II below:

TABLE II

| Example No. | Dyestuff | Type Dyestuff | Color |
|---|---|---|---|
| 9 | Celliton Fast Red GGA | Disperse | Red Tint |
| 10 | Latyl Orange 3R | Disperse | Orange Tint |
| 11 | Eastman Fast Yellow GLF | Disperse | Yellow Tint |
| 12 | Eastman Polyester Red 2G | Disperse | Red Tint |
| 13 | Capracyl Red B | Premetalized | No Color |
| 14 | Xylene Milling Blue BL | Acid | No Color |
| 15 | du Pont Milling Red | Acid | No Color |
| 16 | Amacid Milling Brown | Acid | No Color |
| 17 | Sevron Blue 5G | Basic | No Color |

EXAMPLES 18–24

Eight blends were prepared by mixing 90 parts of crystalline polypropylene and 10 parts of each of the eight block polymers of Examples 1–8 supra. The blending operation was conducted on a two-roll mill for 15–25 minutes at 170°C. Ultraviolet stabilizer (0.1 gram) and thermal stabilizer (0.1 gram) were added to the blend during the milling operation. Milling behavior regarding fluxing, banding, bank, roll, release, dispersion, and hot strength were described as good. Crude fibers were then prepared, then separately dyed with Capracyl Red B, Xylene Milling Blue BL, Sevron Blue 5G, and Celliton Fast Red GGA, and finally scoured as described previously. Results are set out in Table III below:

B. Ninety parts of crystalline polypropylene, 10 parts of the novel ABA block polymer of paragraph A above, 0.005 part UV stabilizer, and 0.005 part thermal stabilizer were blended on a two-roll mill at 170°C. for 5 to 10 minutes. All aspects of the milling operation were rated as good. From these blends, crude fibers were prepared, dyed and scoured as described previous. The dye was Capracyl Red B, a premetallized dye. The crude fibers dyed to a deep red.

TABLE III

Results of Dyeing and Scouring Crude Fibers

| Example number | ABA block polymer [1] | Capracyl Red B; premetallized | Xylene Milling Blue BL; acid | Sevron Blue 5G; basic | Celliton Fast Red GGA; disperse |
|---|---|---|---|---|---|
| 18 | Example No. 1 | Medium Red | Medium Blue | Medium Blue | Deep Red. |
|    | Example No. 2 | Deep Red | Deep Blue | do | Do. |
| 19 | Example No. 3 | do | do | do | Do. |
| 20 | Example No. 4 | Medium Red | Medium Blue | do | Do. |
| 21 | Example No. 5 | do | do | do | Do. |
| 22 | Example No. 6 | Deep Red | Deep Blue | Deep Blue | Do. |
| 23 | Example No. 7 | do | do | do | Do. |
| 24 | Example No. 8 | do | do | do | Do. |

[1] ABA blcok polymer prepared in accordance with the procedure set out in Examples 1–8.

EXAMPLE 25

To a reaction vessel containing 1000 grams of a polyoxyethylene diol having an average molecular weight of approximately 6000 heated to about 65°C. in a nitrogen atmosphere, there were added 8.87 grams of aqueous 50 percent sodium hydroxide solution. The resulting admixture was stirred until solution resulted. Thereafter a 109 gram portion of this solution was transferred to another vessel and heated to 95°C. in a nitrogen atmosphere, and 2.88 grams of diglycidyl ether of 2,2-bis(4-hydroxyphenyl)propane were quickly added, with stirring. This amount corresponds to a molar ratio of 0.5:1 of the diglycidyl ether to the polyoxyethylene diol. Thereafter the temperature was held within the range of 95°C. to 100°C. for 40 minutes, and the reaction mixture was allowed to cool to room temperature and solidify. The solid material was a tan-colored wax which melted at 60°C. A solution of 50 grams of this material in 150 grams of water contained only traces of gel and had a viscosity at 30°C. of 913 centipoises.

EXAMPLE 26

To a reaction vessel containing 3 moles of polyoxyethylene glycol having an average molecular weight of approximately 4000 heated to about 90°C. in a nitrogen atmosphere, there were added 3 moles of aqueous 50 percent sodium hydroxide solution. The resulting admixture was stirred until solution was effected. Thereafter 1.5 moles of diglycidyl ether of hydroquinone were quickly added with stirring. The temperature was held at about 105°C. for 1.5 hours, followed by allowing the resulting reaction product mixture to cool to room temperature. There was obtained a solid polyether product having hydroxyl termination.

EXAMPLE 27

A. Example 1 was repeated except that 10 grams of the polyether product of Example 26 were employed. There was obtained a solid ABA block polymer.

EXAMPLE 28

A. Example 4 was repeated except that 8 grams of the polyether product of Example 27 were employed. There was obtained a solid ABA block polymer.

B. Ninety parts of crystalling polypropylene, 10 parts of the novel ABA block polymer of paragraph A above, 0.005 part thermal stabilizer were blended on a two-roll mill at 170°C. for about 10 minutes. All apsects of the milling operation were rated as good. From these blends, crude fibers were prepared, dyed and scoured as described previous. The dye was Capracyl Red B, a premetallized dye. The crude fibers dyed to a deep red.

What is claimed is:

1. The solid block polymers possessing an ABA structure therefor consisting essentially of:

i. A blocks having the recurring unit shown below:

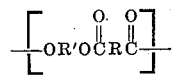

wherein R' is of the group consisting of an aliphatic hydrocarbon radical having from 2 to 20 carbons and an aliphatic oxahydrocarbon radical having up to 20 carbon atoms, wherein R is a divalent aliphatic hydrocarbon radical having up to 20 carbon atoms, and wherein said A blocks represent from about 15 to about 85 weight per cent of said ABA block polymer;

ii. a B block having the recurring unit shown below:

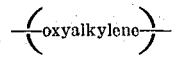

wherein the alkylene moiety contains from 2 to 5 carbon atoms, and wherein said B block represents from about 85 to about 15 weight percent of said ABA block polymer;

iii. wherein the terminal oxy moiety of the B block is monovalently bonded to the terminal carbonyl moiety of one of the A blocks to form an oxycarbonyl group, and wherein the terminal alkylene moiety of the B block is monovalently bonded to an oxy group which in turn is monovalently bonded to the terminal carbonyl moiety of the other A block to thus form an oxycarbonyl group;

iv. wherein the average molecular weight of the B block is at least about 1,000;

v. wherein the average molecular weight of the ABA block polymer is at least about 2,000.

2. The solid block polymer of claim 1 wherein the average molecular weight of the B block is from about 3,000 to about 50,000, and wherein the average molecular weight of the ABA block polymer is from about therefor 6,000 to about therefor 60,000.

3. The solid block polymers of claim 2 wherein the R' substituent is of the group consisting of alkylene and oxaalkylene, each having from 2 to 10 carbon atoms, and wherein the R variable is alkylene of from 1 to 10.

4. The solid block polymers of claim 3 wherein the alkylene moiety of the oxyalkylene unit is of the group consisting of ethylene, propylene, and mixtures thereof; and wherein the R variable is tetramethylene.

* * * * *